US012650950B2

(12) United States Patent
Pasalkar et al.

(10) Patent No.: US 12,650,950 B2
(45) Date of Patent: Jun. 9, 2026

(54) METHOD FOR THROTTLING UNMAP COMMANDS DIRECTED TO A SHARED FILE SYSTEM

(71) Applicant: VMware LLC, Palo Alto, CA (US)

(72) Inventors: Rohan Pasalkar, Mountain View, CA (US); Prasad Rao Jangam, Bangalore (IN); Rahul Kunigal Ravishankar, Bangalore (IN); Pannagashree Mohanakumar, Bangalore (IN); Satyajit Kanungo, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/777,333

(22) Filed: Jul. 18, 2024

(65) Prior Publication Data

US 2026/0023716 A1    Jan. 22, 2026

(51) Int. Cl.
*G06F 16/11* (2019.01)
*G06F 16/176* (2019.01)
*G06F 16/188* (2019.01)

(52) U.S. Cl.
CPC .......... *G06F 16/122* (2019.01); *G06F 16/176* (2019.01); *G06F 16/188* (2019.01)

(58) Field of Classification Search
CPC ..... G06F 16/122; G06F 16/188; G06F 16/176
See application file for complete search history.

(56) References Cited

U.S. PATENT DOCUMENTS

| | | | |
|---|---|---|---|
| 10,740,227 B2 | 8/2020 | Krishnamurthy et al. | |
| 11,334,249 B2 | 5/2022 | Krishnamurthy et al. | |
| 11,341,044 B2 | 5/2022 | Krishnamurthy et al. | |
| 11,922,048 B2 * | 3/2024 | Kang .................... | G06F 3/0604 |
| 2010/0211829 A1 * | 8/2010 | Ziskind .............. | G06F 11/0757 |
| | | | 714/48 |
| 2016/0216894 A1 * | 7/2016 | Nango .................. | G06F 3/0604 |
| 2018/0032541 A1 * | 2/2018 | Park ...................... | G06F 16/122 |
| 2023/0010248 A1 * | 1/2023 | Barhudarian ......... | H04W 12/47 |

* cited by examiner

*Primary Examiner* — Loc Tran
(74) *Attorney, Agent, or Firm* — Kim & Stewart LLP

(57) ABSTRACT

A host computer is configured to issue one or more unmap commands to a file system of a storage device, the file system being shared by a plurality of host computers including the host computer, by performing the steps of: acquiring unmap privilege information from the storage device, the unmap privilege information indicating whether or not an unmap privilege is available to the host computer; in response to determining that the unmap privilege is available, transmitting a request to update an unmap privilege file stored in the storage device to indicate that the host computer has the unmap privilege; and then issuing to the file system, the one or more unmap commands to deallocate storage space from one or more files of the file system.

20 Claims, 6 Drawing Sheets

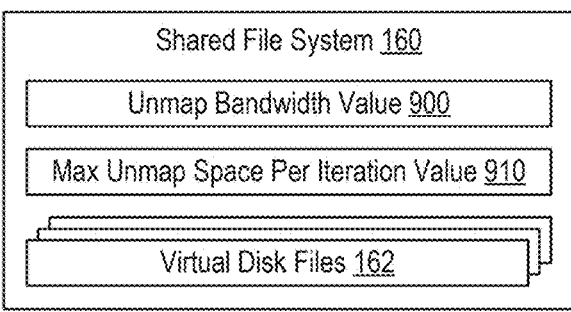

| Shared File System 160 |
| --- |
| Unmap Bandwidth Value 900 |
| Max Unmap Space Per Iteration Value 910 |
| Virtual Disk Files 162 |

START

1002 — Transmit request to shared storage for unmap information including unmap bandwidth value and max unmap space per iteration value 1004 — Receive unmap privilege information from shared storage 1006 — Determine rate for issuing unmap commands per host based on unmap privilege information 1008 — Determine time to wait after each iteration of issuing unmap IOs based on rate per host and amount of space to deallocate per iteration 1010 — Issue to shared file system, unmap command(s) to deallocate storage space from one or more files of shared file system 1012 — Determine if more storage space to deallocate 1014 — More?

Y → 1016 Wait determined amount of time

N → END

Figure 10

METHOD FOR THROTTLING UNMAP COMMANDS DIRECTED TO A SHARED FILE SYSTEM

BACKGROUND

A shared file system may provide simultaneous storage functionality to a plurality of computers, including governing the organization and access of files therein. For example, a clustered file system such as VMware vSphere® Virtual Machine File System (VMFS), available from VMware LLC, provides such functionality for virtual machines (VMs) executing on a plurality of host computers, referred to herein simply as "hosts." Such a shared file system is managed by one or more storage devices such as magnetic drives and/or solid-state drives (SSDs). The file system is mounted on each of the hosts so that files of the file system are accessible to virtualization software executing on the hosts, the virtualization software on each host referred to as a hypervisor. Furthermore, the files of the file system may be "thinly" provisioned such that storage space allocated to the files are increased or decreased on demand.

One type of command that may be issued by each of the hosts to such a shared file system is an unmap command. Hosts issue unmap commands to the file system to deallocate storage space from files therein such as from virtual disks of VMs, thus reducing the storage space allocated to those files. A virtual disk is a file or set of files that reproduce the function of a storage device, e.g., a magnetic drive or SSD. The deallocation is typically accompanied by data blocks being zeroed by the storage device(s) that are storing the data of the shared file system, to delete previously stored information. Some unmap commands may originate from VMs, the VMs transmitting the unmap commands to respective hypervisors. Other unmap commands may originate from the hypervisors, e.g., to deallocate storage space from files of VMs that are being powered off. In each case, the hypervisors issue the unmap commands to the shared file system, possibly asynchronously.

Deallocating storage space in response to issued unmap commands may be problematic because of its usage of processing resources of the storage device(s) managing the shared file system. The number of hosts using a shared file system may be numerous, e.g., in the hundreds, sometimes leading to a storage device simultaneously processing unmap commands for many hosts at one time. Furthermore, in some cases, each of the hosts accesses a plurality of logical unit numbers (LUNs) of the storage device(s). At any time, a host may simultaneously issue unmap commands targeting data blocks of several different LUNs, further increasing the possible load on the storage device(s) for processing unmap commands at any given time.

As the number of hosts and numbers of LUNs accessed per host increase, a likelihood increases for unmap commands to overwhelm the processing resources of the storage device(s). Consequently, the performance of other commands degrades, including for read and write commands originating from the VMs for reading from and writing to respective files. A method is needed for managing the performance of unmap commands issued by hosts accessing a shared file system, that avoids degrading the performance of other commands.

SUMMARY

One or more embodiments provide a host including a processor and memory, wherein the processor executes instructions stored in the memory to issue one or more unmap commands to a file system of a storage device, the file system being shared by a plurality of hosts including the host. The host performs the steps of: acquiring unmap privilege information from the storage device, the unmap privilege information indicating whether or not an unmap privilege is available to the host; in response to determining that the unmap privilege is available, transmitting a request to update an unmap privilege file stored in the storage device to indicate that the host has the unmap privilege; and then issuing to the file system, the one or more unmap commands to deallocate storage space from one or more files of the file system.

Further embodiments include a method comprising the above steps and a non-transitory computer-readable storage medium comprising instructions that cause a host to carry out the above steps.

BRIEF DESCRIPTION OF THE DRAWINGS

FIG. 9 is a block diagram illustrating an example of the shared file system, according to a third embodiment.

FIG. 10 is a flow diagram of a method that may be performed by the host to issue one or more unmap commands to the shared file system, according to the third embodiment.

DETAILED DESCRIPTION

Figures 1, 2, 3:
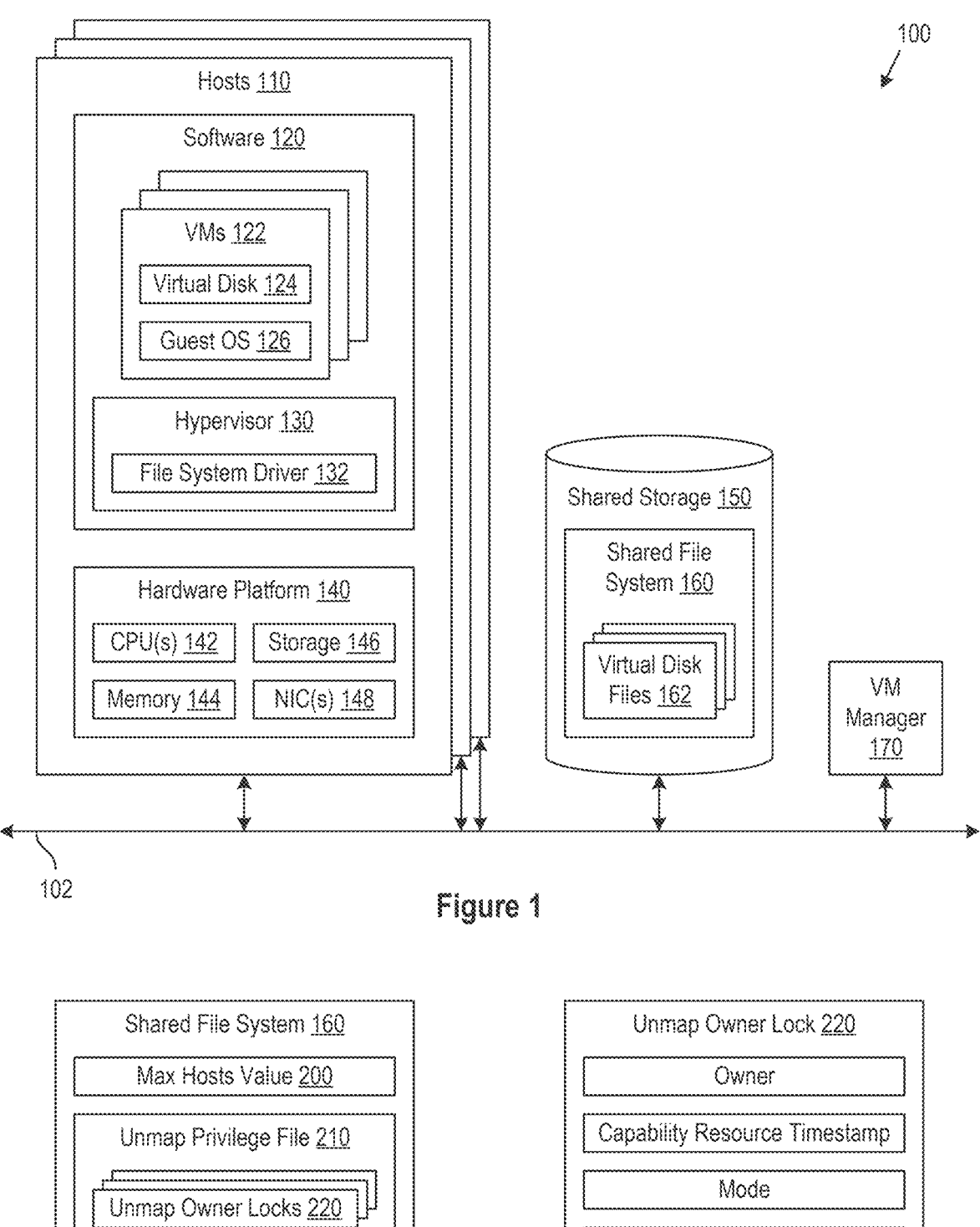
FIG. 1 is a block diagram of a computer system in which embodiments may be implemented.
FIG. 2 is a block diagram illustrating an example of a shared file system of the computer system, according to some embodiments.
FIG. 3 is a block diagram illustrating an example of a lock used by the shared file system to manage privileges of hosts of the computer system for issuing unmap commands to the shared file system, according to some embodiments.

Techniques are described for managing the performance of unmap commands issued by hosts accessing a shared file system, that avoids degrading the performance of other commands. Such techniques throttle the issuance of the unmap commands by the hosts. Such throttling limits the maximum amount of storage space that may be targeted by unmap commands at a given time by one or more storage devices managing the shared file system. Accordingly, processing resources of the storage device(s) are not overwhelmed by the unmap commands, which allows the storage device(s) to perform other commands issued by the hosts such as read and write commands, without being overly slowed down by processing unmap commands.

According to some embodiments, the storage device manages an "unmap privilege." Those hosts that have the unmap privilege at a given time are allowed to issue unmap commands to the shared file system. Those hosts that do not have the unmap privilege are not allowed to issue unmap commands. The storage device limits the number of hosts that simultaneously have the unmap privilege, which effectively throttles the amount of storage space requested at a given time to be deallocated from files of the shared file system.

According to a first embodiment, to acquire the unmap privilege, a host accesses a file, referred to herein as an "unmap privilege file." The host scans the file to determine whether the unmap privilege is available. If the unmap privilege is available, the host transmits a request to the storage device for the storage device to update the unmap privilege file to indicate that the host has the unmap privilege. Thereafter, the host issues unmap commands to the storage device.

According to a second embodiment, to acquire the unmap privilege, a host accesses statuses of other hosts that already have the unmap privilege. The host scans such statuses to determine if any of such hosts are currently idle, i.e., if any of such hosts have not recently issued any unmap commands to the shared file system, e.g., over a past predetermined amount of time such as in the past minute. Once one of such hosts becomes idle, the host requests the idle host to transfer the unmap privilege from itself to the requesting host. In response, the idle host updates the unmap privilege file to indicate that the requesting host has the unmap privilege. Thereafter, the requesting host issues unmap commands to the storage device.

According to a third embodiment, each of the hosts is able to simultaneously issue unmap commands to the shared file system. However, the rate at which storage space is permitted to be targeted by unmap commands is capped. This avoids the hosts collectively requesting deallocation of an amount of storage space at a given time, that would degrade the performance of other commands by the storage device(s).

Embodiments of this invention are useful in a wide array of applications in which hosts issue unmap commands to a shared file system. Such applications include, e.g., a host performing garbage collection to deallocate data blocks that do not store any valid data, and a host compressing data or performing deduplication of data and then deallocating data blocks that are no longer needed for storing the data. These and further aspects of the invention are discussed below with respect to the drawings.

FIG. 1 is a block diagram of a computer system 100 in which embodiments may be implemented. Computer system 100 includes a cluster of hosts 110, shared storage 150, and a VM management appliance 170, referred to herein simply as a "VM manager." In the example illustrated in FIG. 1, shared storage 150 implements a clustered file system such as VMware vSphere® VMFS, available from VMware LLC, for a plurality of VMs 122 executing on hosts 110. However, it will be apparent that embodiments of the present invention are not limited to clustered file systems or to VMs.

Each of hosts 110 is constructed on a hardware platform 140 such as an x86 architecture platform. Hardware platform 140 includes components of a computer, such as one or more central processing units (CPUs) 142, memory 144 such as random-access memory (RAM), local storage 146 such as one or more magnetic drives or SSDs, and one or more network interface controllers (NICs) 148. CPU(s) 142 are configured to execute instructions such as executable instructions that perform one or more operations described herein, which may be stored in memory 144. NICs 148 enable hosts 110 to communicate with each other and with other devices over a network 102 such as a local area network (LAN), including with shared storage 150 and VM manager 170.

Shared storage 150 includes one or more storage arrays (not shown) such as network-attached storage (NAS) or data storage accessible via a storage area network (SAN). Such storage array(s) may comprise, for example, magnetic drives and/or SSDs. Shared storage 150 manages a shared file system 160 for hosts 110. Shared file system 160 governs the organization of and access to files therein such as virtual disk files 162, which are discussed further below. In the embodiment illustrated in FIG. 1, each of hosts 110 accesses shared storage 150 by using NIC(s) 148 to connect to network 102. In another embodiment, each of hosts 110 includes a host bus adapter (HBA) for transmitting commands to shared storage 150 over a separate network such as a fibre channel (FC) network.

Hardware platform 140 of each of hosts 110 supports software 120. Software 120 includes a hypervisor 130, which is a software layer or component that supports the execution of multiple virtualized computing instances such as VMs 122. A virtualized computing instance is an addressable data compute node (DCN) or isolated user space instance, such as a VM or container. One example of hypervisor 130 is a VMware ESX® hypervisor, available from VMware LLC. Although the disclosure is described with reference to VMs, the teachings herein also apply to other types of virtualized computing instances such as containers, and to other processes sharing a file system and issuing unmap commands thereto.

Each of VMs 122 includes a virtual disk 124 and a guest operating system (OS) 126. Each of virtual disks 124 is associated with one of virtual disk files 162 in shared storage 150. Each of virtual disks 124 exposes a respective one of VMs 122 to an abstraction of shared storage 150. Each of guest OSs 126 generates commands for a respective one of virtual disks 124 such as read, write, and unmap commands.

The commands generated by guest OSs 126 are routed to hypervisor 130, which translates such commands to be directed to corresponding virtual disk files 162. Each of virtual disks 124 are thus merely logical abstractions, e.g., of magnetic disks or SSDs, corresponding virtual disk files 162 storing data associated therewith. In addition to the commands generated by (originating from) VMs 122, hypervisor 130 generates commands such as unmap commands directed to virtual disk files 162. Hypervisor 130 includes a file system driver 132 that manages the creation, use, and deletion of associated virtual disk files 162. File system driver 132 converts commands such as unmap commands to raw small computer system interface (SCSI) operations and issues the SCSI operations to shared file system 160 to be applied by shared storage 150.

It should be noted that hypervisor 130 may issue commands to shared file system 160 asynchronously, e.g., by queuing unmap commands generated thereby and by VMs 122, and issuing such commands in batches. Accordingly, hypervisor 130 may include a data access layer (not shown) that applies command queuing and scheduling policies to raw SCSI unmap operations before transmitting them to shared storage 150. Virtual disk files 162 may be stored, e.g., in LUNs exposed by shared storage 150. In embodiments described herein, virtual disk files 162 may be thinly provisioned, so storage space may be allocated therefor on demand.

VM manager 170 may logically group hosts 110 into a cluster to perform cluster-level tasks such as provisioning and managing VMs 122 and migrating VMs 122 from one of hosts 110 to another. For example, VM manager 170 may communicate with hosts 110 via a management network (not shown) provisioned from network 102. VM manager 170 may be, e.g., a physical server or one of VMs 122. One example of VM manager 170 is VMware vCenter Server,® available from VMware LLC.

FIG. 2 is a block diagram illustrating an example of shared file system 160, according to some embodiments. In addition to virtual disk files 162, shared file system 160 includes unmap privilege information indicating which of hosts 110 have an unmap privilege and indicating whether or not the unmap privilege is available to others of hosts 110. Those of hosts 110 that have the unmap privilege at a given time are allowed to issue unmap commands to shared file system 160. Those of hosts 110 that do not have the unmap privilege are not allowed to issue unmap commands. In the example of FIG. 2, the unmap privilege information includes a maximum (max) hosts value 200 and an unmap privilege file 210.

According to some embodiments, max hosts value 200 represents the total amount of hosts 110 that are allowed to simultaneously have the unmap privilege. For example, max hosts value 200 may be a field of a file system header at the beginning of shared file system 160. Max hosts value 200 may have a default value such as 64 hosts, which allows only the default number of hosts to issue unmap commands at a given time. An administrator of computer system 100 may adjust max hosts value 200 to increase to decrease the amount of hosts that have the unmap privilege.

Unmap privilege file 210 includes unmap owner locks 220. When one of hosts 110 acquires the unmap privilege, shared storage 150 updates one of unmap owner locks 220 to include information identifying the one of hosts 110 as having the unmap privilege. Such one of hosts 110 then "owns" that one of unmap owner locks 220. For example, each of unmap owner locks 220 may be a data structure with a plurality of fields.

In the example of FIG. 2, there is a one-to-one correspondence between hosts 110 that have the unmap privilege and unmap owner locks 220. Accordingly, for embodiments that utilize max hosts value 200, the maximum number of unmap owner locks 220 that may be simultaneously owned is equal to max hosts value 200. For example, the number of unmap owner locks 220 may be equal to max hosts value 200. On the other hand, the number of unmap owner locks 220 may be larger than max hosts value 200, and shared file system 160 may limit how many of unmap owner locks 220 are available. Including such a larger number of unmap owner locks 220 (e.g., 1,024 unmap owner locks 220) accommodates an administrator increasing max hosts value 200 over time when it is desired for shared storage 150 to use more processing resources thereof for processing unmap commands.

FIG. 3 is a block diagram illustrating an example of one of unmap owner locks 220 of unmap privilege file 210, according to some embodiments. Unmap owner lock 220 includes a plurality of fields, including, e.g., an owner field, a capability resource timestamp field, a mode field, a heartbeat address field, and a heartbeat timestamp field. The owner field may store an identifier (ID) of the one of hosts 110 that owns unmap owner lock 220, such as a universally unique ID (UUID). The capability resource timestamp field may store a timestamp indicating a time at which the owner acquired the unmap privilege and became the owner of unmap owner lock 220. The mode field may store a value indicating how the owner owns unmap owner lock 220. For example, according to embodiments, the value may indicate that the owner has exclusive ownership of unmap owner lock 220 such that no others of hosts 110 may simultaneously own unmap owner lock 220.

The heartbeat address and heartbeat timestamp fields are related to a "heartbeat" of the owner of unmap owner lock 220. Heartbeat is a mechanism indicating a "liveness" of an associated one of hosts 110, with respect to other devices including shared storage 150. For example, if one of hosts 110 crashes or otherwise loses its connection to shared storage 150, that one of hosts 110 is said to "lose its heartbeat." To track such heartbeat, shared file system 160 allocates slots to hosts 110 when hosts 110 mount shared file system 160 thereon. Each of hosts 110 periodically updates data stored at its respective slot such as a timestamp, e.g., every few seconds, to communicate its liveness. The heartbeat address field may store the address of shared file system 160 associated with the heartbeat slot of the owner of unmap owner lock 220. The heartbeat timestamp field may store a timestamp indicating a time at which the owner most recently updated data at its respective heartbeat slot.

Figure 4:
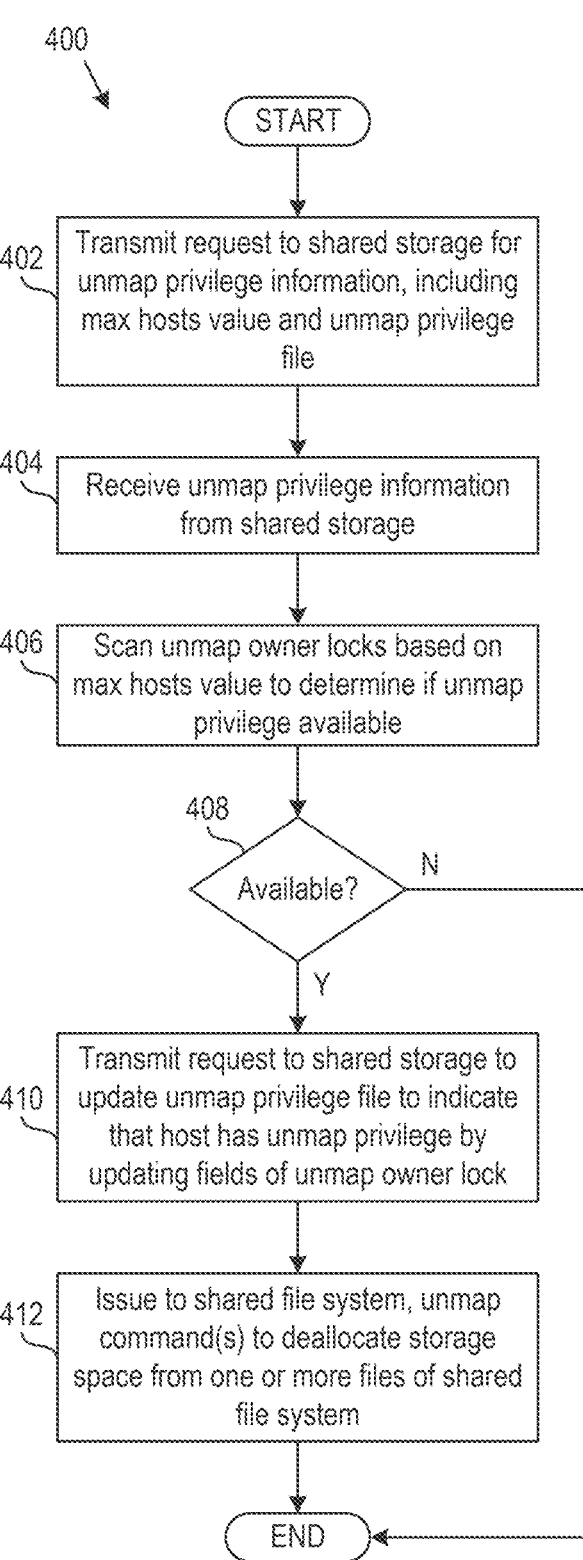
FIG. 4 is a flow diagram of a method that may be performed by a host of the computer system to issue one or more unmap commands to the shared file system, according to a first embodiment.

FIG. 4 is a flow diagram of a method 400 that may be performed by one of hosts 110 to issue one or more unmap commands to shared file system 160, according to the first embodiment. According to the first embodiment, to acquire the unmap privilege, host 110 accesses unmap privilege file 210 to determine whether the unmap privilege is available and to request shared storage 150 to update unmap privilege file 210 when the unmap privilege is available. Method 400 may be performed each time host 110 determines to acquire the unmap privilege to issue one or more unmap commands to shared file system 160. At step 402, host 110 transmits a request to shared storage 150 for unmap privilege information, including, e.g., max hosts value 200 and unmap privilege file 210. It should be noted that host 110 may request max hosts value 200 and unmap privilege file 210 separately.

At step 404, host 110 receives the unmap privilege information from shared storage 150. At step 406, host 110 scans unmap owner locks 220 of unmap privilege file 210 to determine if the unmap privilege is available. Host 110 may scan unmap owner locks 220 based on max hosts value 200. For example, if there are more of unmap owner locks 220 than the value of max hosts value 200, host 110 may limit the scanning to only a range of unmap owner locks 220. For example, if max hosts value 200 is set to 64 hosts, host 110 may only scan the first 64 of unmap owner locks 220, others of unmap owner locks 220 being unavailable. The scanning of step 406 is discussed further below in conjunction with FIGS. 5-6.

At step 408, if host 110 determines that the unmap privilege is unavailable, method 400 ends. Host 110 may later repeat steps 402-406 to determine if the unmap privilege becomes available, e.g., after waiting a predetermined amount of time. Returning to step 408, if host 110 determines that the unmap privilege is available, method 400 moves to step 410. At step 410, host 110 transmits a request to shared storage 150 to update unmap privilege file 210 to indicate that host 110 has the unmap privilege. Specifically, host 110 requests shared storage 150 to update one of unmap owner locks 220 that host 110 has identified as being available in step 406. Shared storage 150 then updates the identified one of unmap owner locks 220, at which point it is owned by host 110 and host 110 has acquired the unmap privilege.

For example, host 110 may request shared storage 150 to update the owner field of the identified one of unmap owner locks 220, to an ID of host 110. Host 110 may also request shared storage 150 to update the capability resource timestamp field to a timestamp indicating a time of host 110 acquiring the unmap privilege. Host 110 may also request shared storage 150 to update the mode to indicate host 110 having exclusive ownership of the identified one of unmap owner locks 220. Host 110 may also request shared storage 150 to update the heartbeat address to an address of shared file system 160 associated with the heartbeat slot of host 110. Host 110 may also request shared storage 150 to update the heartbeat timestamp field to a timestamp indicating a time at which host 110 most recently updated data at its heartbeat slot.

At step 412, host 110 issues to shared file system 160, one or more unmap commands to deallocate storage space from one or more files of shared file system 160, e.g., from virtual disk files 162 corresponding to VMs 122 executing on host 110. Some of such unmap commands may originate from VMs 122 executing thereon, while others of such unmap commands may originate from hypervisor 130. After step 412, method 400 ends.

It should be noted that host 110 may later "release" the identified one of unmap owner locks 220 to make it available to others of hosts 110 (and to make the unmap privilege free to be acquired by others of hosts 110). For example, host 110 may not have any pending unmap commands to issue for a predetermined length of time, and host 110 may also not currently have any file opened in shared file system 160. In response thereto, host 110 may determine to release the identified one of unmap owner locks 220, e.g., by requesting shared storage 150 to clear the fields thereof such as by setting the values of the fields thereof to NULL. It should also be noted that according to some embodiments, usage of max hosts value 200 is not required. For example, if the number of unmap owner locks 220 is equal to the maximum allowable amount of hosts 110 that may simultaneously have the unmap privilege, host 110 may simply scan all of unmap owner locks 220 to determine if the unmap owner privilege is available.

Figure 5:
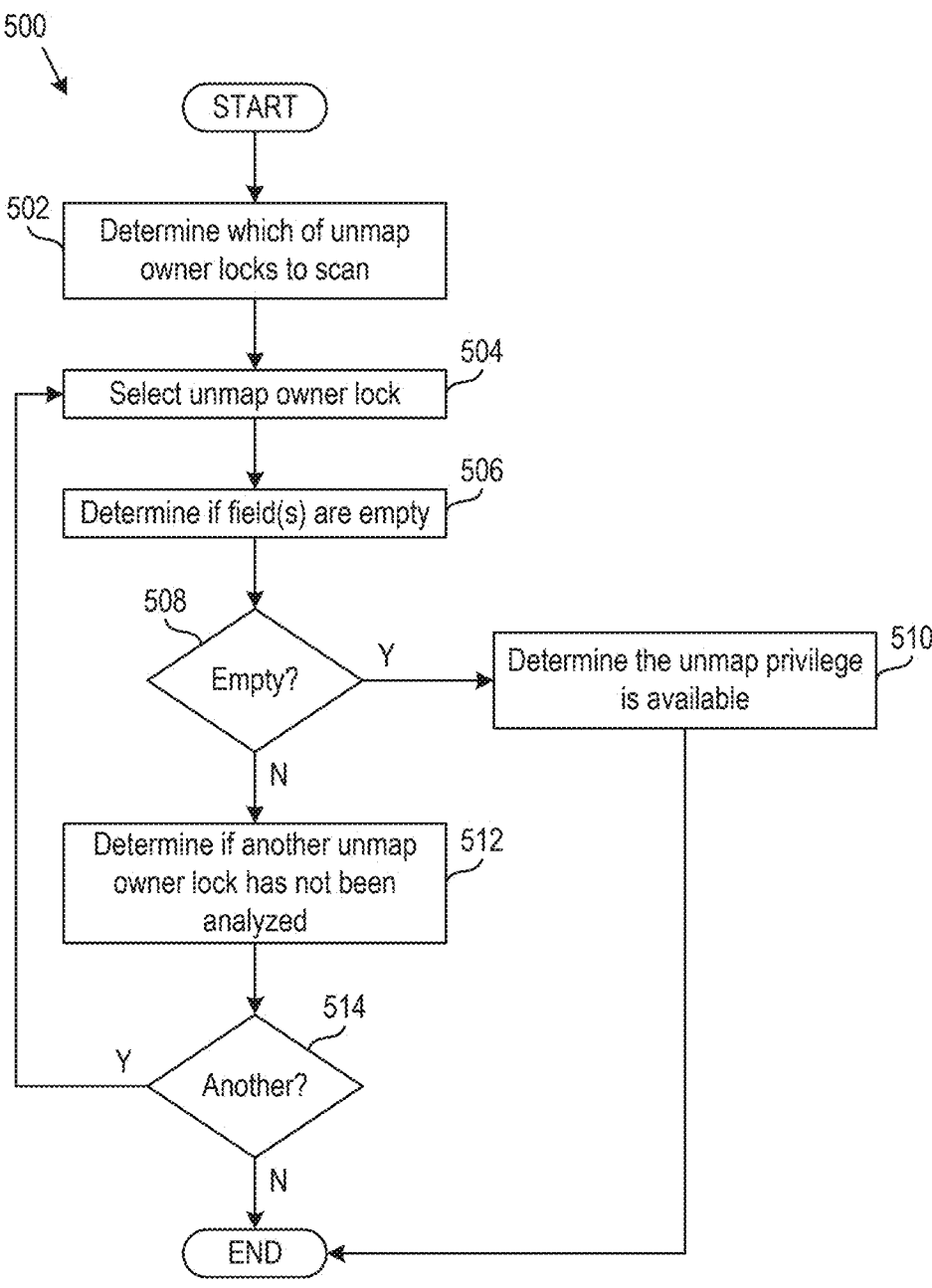
FIG. 5 is a flow diagram of a method that may be performed by the host to determine if a privilege is available for issuing unmap commands to the shared file system, according to the first embodiment.

FIG. 5 is a flow diagram of a method 500 that may be performed by one of hosts 110 to determine if the unmap privilege is available, according to the first embodiment. At step 502, host 110 determines which of unmap owner locks 220 to scan. For example, host 110 may determine a range of unmap owner locks 220 based on max hosts value 200, e.g., the first 64 of unmap owner locks 220 if max hosts value 200 is set to 64 hosts. At step 504, host 110 selects one of unmap owner locks 220, e.g., in a range determined at step 502.

At step 506, host 110 determines if one or more of the fields of the selected one of unmap owner locks 220 is empty. For example, host 110 may determine if the owner field is empty, e.g., set to NULL. As another example, host 110 may determine if every field is empty. At step 508, if the field(s) analyzed at step 506 are empty, method 500 moves to step 510. At step 510, host 110 determines that the unmap privilege is available. After step 510, method 500 ends, and host 110 acquires the unmap privilege via the selected one of unmap owner locks 220, as discussed above in conjunction with FIG. 4.

Returning to step 508, if the field(s) analyzed at step 506 are not empty, method 500 moves to step 512. At step 512, host 110 determines if another of unmap owner locks 220 has not been analyzed, e.g., in a range determined at step 502. At step 514, if there is another one of unmap owner locks 220 to analyze, method 500 returns to step 504, and host 110 selects another one of unmap owner locks 220. Otherwise, if there are no more of unmap owner locks 220 to analyze, after step 514, method 500 ends.

If host 110 does not determine that the unmap privilege is available based on method 500, host 110 may determine that the unmap privilege is unavailable. Alternatively, host 110 may perform further steps for determining if the unmap privilege is available, as discussed below in conjunction with FIG. 6. Additionally, as mentioned above, usage of max hosts value 200 is not required. For example, if the number of unmap owner locks 220 is equal to the maximum allowable amount of hosts 110 that may simultaneously have the unmap privilege, host 110 may simply scan all of unmap owner locks 220 to determine if the unmap owner privilege is available.

Figure 6:
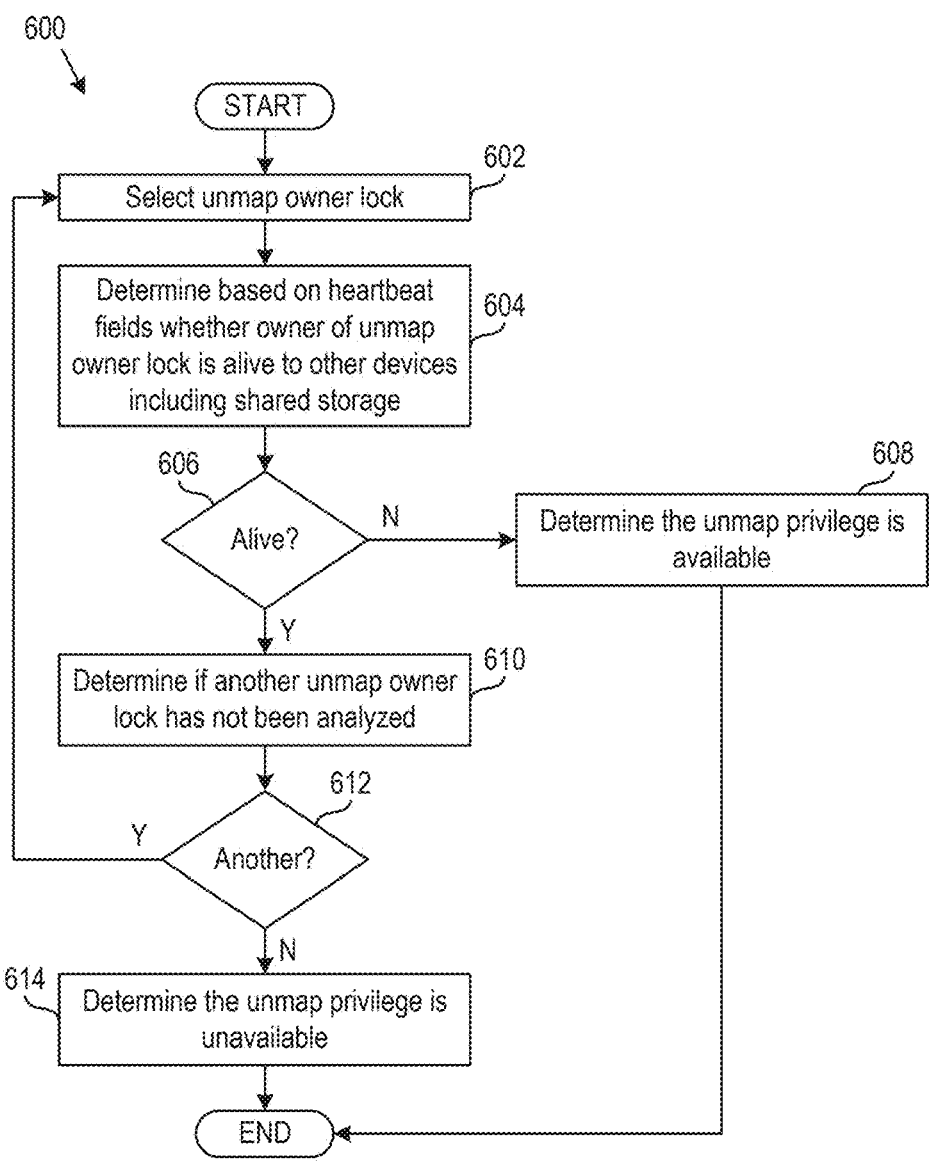
FIG. 6 is a flow diagram of another method that may be performed by the host to determine if the privilege is available for issuing unmap commands to the shared file system, according to the first embodiment.

FIG. 6 is a flow diagram of a method 600 that may be performed by host 110 to determine if the unmap privilege is available, according to the first embodiment. For example, host 110 may perform method 600 after performing method 500 if host 110 does not determine that the unmap privilege is available based on method 500. Host 110 may then perform method 600 to determine if the unmap privilege is available despite a field(s) of unmap owner locks 220 not being empty. Method 600 is based on the heartbeats of owners of unmap owner locks 220, one of unmap owner locks 220 being deemed available if the owner thereof has lost its heartbeat.

At step 602, host 110 selects one of unmap owner locks 220, e.g., in a range determined based on max hosts value 200. At step 604, host 110 determines based on heartbeat fields of the selected one of unmap owner locks 220, whether the owner is alive to other devices including shared storage 150. For example, host 110 may check the heartbeat timestamp field to determine if the owner updated the heartbeat timestamp recently, e.g., in the past predetermined number of seconds such as 10 seconds. If the owner updated the timestamp recently, host 110 considers the owner to be alive, and if the owner has not updated the timestamp recently, host 110 considers the owner to not to be alive, i.e., to have lost its heartbeat.

At step 606, if the owner is not alive based on the heartbeat fields, method 600 moves to step 608. At step 608, host 110 determines that the unmap privilege is available. After step 608, method 600 ends, and host 110 acquires the unmap privilege via the selected one of unmap owner locks 220, as discussed above in conjunction with FIG. 4. Returning to step 606, if the owner is alive based on the heartbeat fields, method 600 moves to step 610.

At step 610, host 110 determines if another of unmap owner locks 220 has not been analyzed, e.g., in a range determined based on max hosts value 200. At step 612, if there is another one of unmap owner locks 220 to analyze, method 600 returns to step 602, and host 110 selects another one of unmap owner locks 220. Otherwise, if there are no more of unmap owner locks 220 to analyze, method 600 moves to step 614. At step 614, host 110 determines that the unmap privilege is unavailable. After step 614, method 600 ends.

Figure 7:
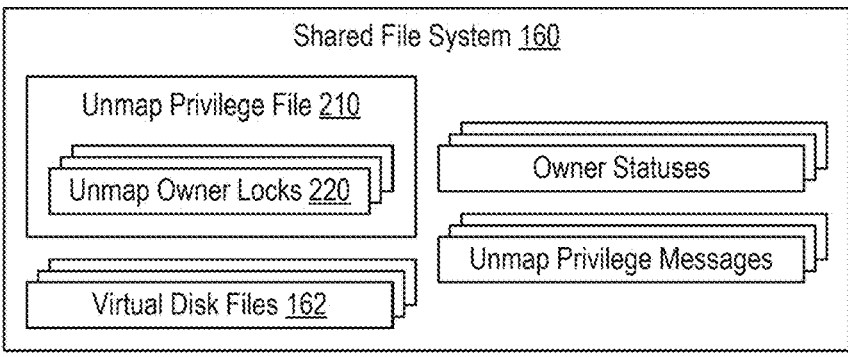
FIG. 7 is a block diagram illustrating an example of the shared file system, according to a second embodiment.

FIG. 7 is a block diagram illustrating an example of shared file system 160, according to the second embodiment. According to the second amendment, hosts 110 communicate with each other to take turns acquiring the unmap privilege. Such communication may be carried out via shared storage 150, e.g., to account for situations in which hosts 110 are not connected directly to each other. Through such communication, one of hosts 110 requests another of hosts 110 that currently has the unmap privilege, to transfer the unmap privilege, e.g., if the other of hosts 110 is currently idle with respect to issuing unmap IOs.

In the example of FIG. 7, in addition to virtual disk files 162 and unmap privilege file 210, shared file system 160 includes owner statuses and unmap privilege messages. Owner statuses correspond to owners of unmap owner locks 220, i.e., to hosts 110 that currently have the unmap privilege. For example, an owner status may indicate that an associated owner is active, i.e., has recently issued at least one unmap command to the shared file system, e.g., over a past predetermined amount of time such as in the past minute. As another example, an owner status may indicate that an associated owner is idle.

Unmap privilege messages are messages transmitted by hosts 110 to be read by others of hosts 110. For example, a first one of hosts 110 may transmit an unmap privilege message to shared storage 150, requesting a second one of hosts 110 to transfer the unmap privilege thereto. In response, after updating one of unmap owner locks 220 owned by the second one of hosts 110, the second one of hosts 110 may transmit an unmap privilege message to shared storage 150, indicating that the first one of hosts 110 has acquired the unmap privilege. Each of hosts 110 may periodically request the owner statuses and unmap privilege messages from shared storage 150, to determine when one of the owner statuses changes and to read new unmap privilege messages.

Figure 8:
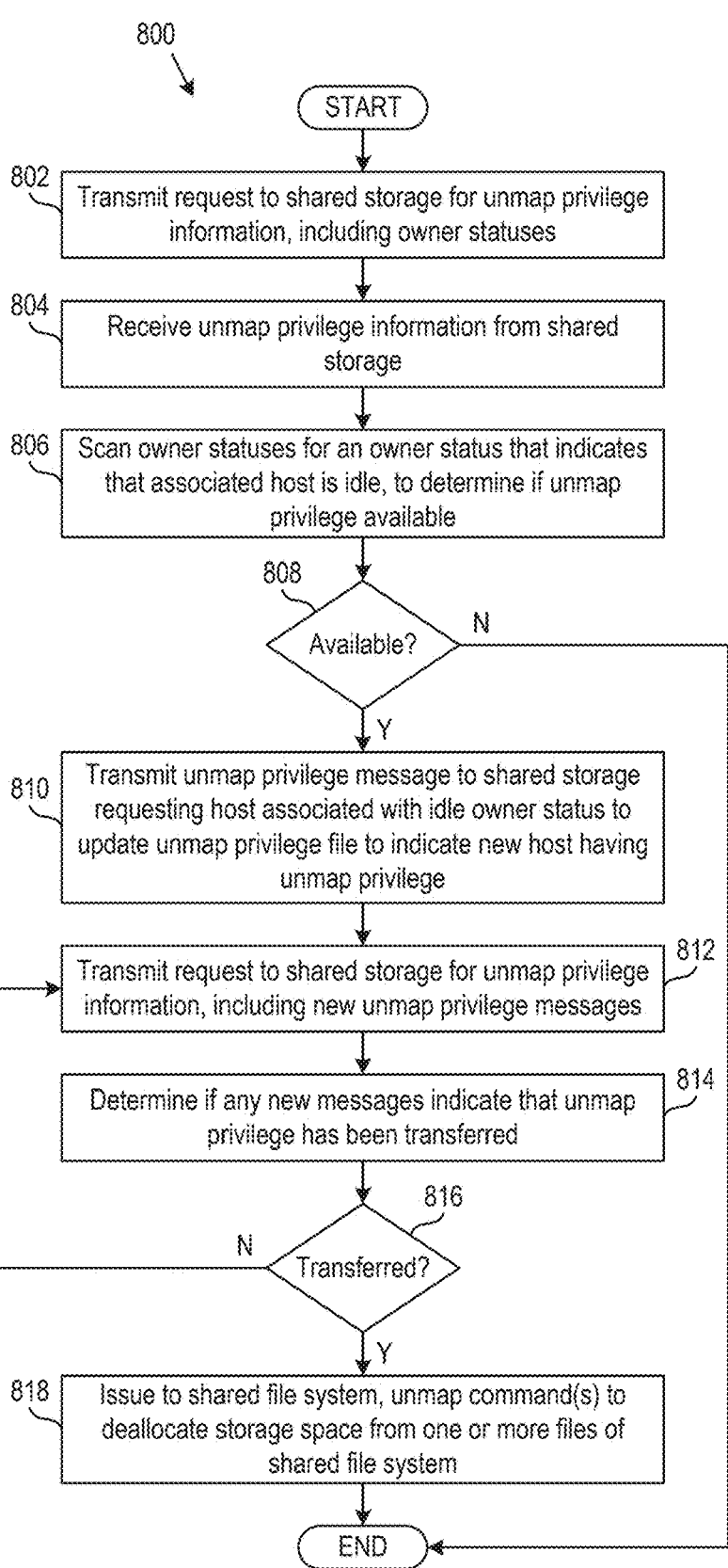
FIG. 8 is a flow diagram of a method that may be performed by the host to issue one or more unmap commands to the shared file system, according to the second embodiment.

FIG. 8 is a flow diagram of a method 800 that may be performed by one of hosts 110 to issue one or more unmap commands to shared file system 160, according to the second embodiment. Method 800 may be performed each time host 110 determines to acquire the unmap privilege to issue one or more unmap commands to shared file system 160. At step 802, host 110 transmits a request to shared storage 150 for unmap privilege information, including, e.g., owner statuses. At step 804, host 110 receives the unmap privilege information from shared storage 150.

At step 806, host 110 scans the owner statuses to determine if the unmap privilege is available. Specifically, host 110 may search for an owner status that indicates that a corresponding one of hosts 110 is idle. If host 110 finds one of such owner statuses, host 110 determines that the unmap privilege is available, the corresponding one of unmap owner locks 220 being deemed available. Otherwise, if all the owners statuses indicate that corresponding hosts 110 are active, host 110 determines that the unmap privilege is unavailable.

At step 808, if host 110 determines that the unmap privilege is unavailable, method 800 ends. Host 110 may later repeat steps 802-806 to determine if the unmap privilege becomes available, e.g., after waiting a predetermined amount of time. Returning to step 808, if host 110 determines that the unmap privilege is available, method 800 moves to step 810. At step 810, host 110 transmits an unmap privilege message to shared storage 150 identifying one of hosts 110 that has the unmap privilege but is indicated by one of the owner statuses as being idle. Hereafter, for simplicity, host 110 acquiring the unmap privilege will be referred to as "first host" 110, and host 110 that is idle will be referred to as "second host" 110. The message from first host 110 requests second host 110 to update unmap privilege file 210 to indicate first host 110 as having the unmap privilege.

After step 810, shared storage 150 stores the unmap privilege message from first host 110 in shared file system 160. The next time second host 110 reads unmap privilege messages including the new unmap privilege message from first host 110, second host 110 updates the one of unmap owner locks 220 that it owns. Specifically, second host 110 may request shared storage 150 to update fields thereof, in the manner discussed above in conjunction with FIG. 4. Such updating may add to the one of unmap owner locks 220, values associated with first host 110 such as an ID thereof, in place of values associated with second host 110, thus transferring the unmap privilege from second host 110 to first host 110. Second host 110 may then transmit an unmap privilege message to shared storage 150, indicating the transfer of the unmap privilege.

At step 812, first host 110 transmits a request to shared storage 150 for unmap privilege information, including new unmap privilege messages. At step 814, first host 110 determines whether new unmap privilege messages (if any) received from shared storage 150 indicate that the unmap privilege has been transferred to first host 110. At step 816, if first host 110 has not yet received such an unmap privilege message, method 800 returns to step 812, and first host 110 again requests the unmap privilege information.

Once first host 110 receives such an unmap privilege message, method 800 moves from step 816 to step 818. At step 818, first host 110 issues to shared file system 160, one or more unmap commands to deallocate storage space from one or more files of shared file system 160, e.g., from virtual disk files 162 corresponding to VMs 122 executing on first host 110. Some of such unmap commands may originate from VMs 122 executing thereon, while others of such unmap commands may originate from hypervisor 130. After step 818, method 800 ends.

It should be noted that first host 110 upon acquiring the unmap privilege is associated with an active owner status. First host 110 may later request shared storage 150 to update its owner status to idle when it has not issued any unmap commands to the shared file system, e.g., for a predetermined amount of time such as a minute. It should also be noted that instead of waiting for an unmap privilege message from second host 110, first host 110 may instead scan unmap owner locks 220 to determine when one of unmap owner locks 220 has been transferred thereto, at which point first host 110 may issue one or more unmap commands to shared file system 160.

FIG. 9 is a block diagram illustrating an example of shared file system 160, according to the third embodiment. According to the third embodiment, each of hosts 110 is able to simultaneously issue unmap commands to shared file system 160. However, the rate at which storage space is permitted to be targeted by unmap commands is capped. This limits the rate at which each of hosts 110 is permitted to request storage space to be deallocated from associated files of shared file system 160, e.g., from virtual disk files 162.

In addition to virtual disk files 162, shared file system 160 may include an unmap bandwidth value 900, which indicates the maximum rate at which storage space is permitted to be targeted by unmap commands collectively across hosts 110. Unmap bandwidth value 900 may have a default value such as 128 megabytes per second. Shared file system 160 may further include a maximum (max) unmap space per iteration value 910.

Max unmap space per iteration value 910 indicates the maximum amount of storage space that each of hosts 110 is permitted to request to be deallocated each time host 110 issues one or more unmap commands to shared file system 160 (each iteration of issuing unmap commands). Max unmap space per iteration value 910 may have a default value such as 512 megabytes, which may correspond to a convenient amount of storage space to be deallocated at a time such as an amount of storage space that each of a plurality of metadata structures of shared storage 150 corresponds to. An administrator may adjust unmap bandwidth value 900 and/or max unmap space per iteration value 910, e.g., increasing one or both to increase the processing resources of shared storage 150 used for processing unmap commands, or decreasing one or both to decrease the processing resources used for processing unmap commands.

FIG. 10 is a flow diagram of a method 1000 that may be performed by one of hosts 110 to issue one or more unmap commands to shared file system 160, according to the third embodiment. Method 1000 may be performed when host 110 mounts shared file system 160 thereon. At step 1002, host 110 transmits a request to shared storage 150 for unmap privilege information, including, e.g., unmap bandwidth value 900 and max unmap space per iteration value 910. At step 1004, host 110 receives the unmap privilege information from shared storage 150.

At step 1006, host 110 determines a rate for issuing unmap commands per host based on the unmap privilege information. For example, if unmap bandwidth value 900 is set to 128 megabytes per second and there are 64 of hosts 110 accessing shared file system 160, host 110 divides these values to determine that the rate per host is 2 megabytes per second per host. Such rate may apply collectively to all the LUNs accessed by each of hosts 110. In other words, each of hosts 110 issuing unmap commands to a plurality of LUNs may divide its respective processing resources of shared storage 150 for unmap commands (e.g., divide 2 megabytes per second) among the LUNs accessed thereby.

At step 1008, host 110 determines an amount of time to wait after each iteration of issuing unmap commands to shared file system 160, based on the rate determined at step 1006 and based on how much space host 110 may deallocate per iteration, e.g., max unmap space per iteration value 910. For example, the rate determined at step 1006 may be 2 megabytes per second, and max unmap space per iteration value 910 may be set to, e.g., 512 megabytes. Accordingly, if each iteration, host 110 issues unmap commands requesting deallocation of an amount of storage space equaling max unmap space per iteration value 910, host 110 divides these values to determine to wait 256 seconds between iterations of issuing unmap commands to shared file system 160.

At step 1010, host 110 issues to shared file system 160, one or more unmap commands to deallocate storage space from one or more files of shared file system 160, e.g., from virtual disk files 162 corresponding to VMs 122 executing on host 110. Some of such unmap commands may originate from VMs 122 executing thereon, while others of such unmap commands may originate from hypervisor 130. If shared storage 150 utilizes max unmap space per iteration value 910, host 110 limits such unmap commands to ensure that it is not requesting more than such value of storage space for deallocating. Host 110 may thus divide pending unmap commands thereof for issuing in separate batches to avoid exceeding max unmap space per iteration value 910.

At step 1012, host 110 determines if it has more storage space to deallocate from files thereof, i.e., if hypervisor 130 therein has pending unmap commands to issue to shared storage 160. At step 1014, if host 110 has more storage space to deallocate, method 1000 moves to step 1016. At step 1016, host 110 waits for the amount of time determined at step 1008, e.g., 256 seconds. Method 1000 then returns to step 1010, and host 110 issues one or more unmap commands to deallocate more storage space from one or more files of shared file system 160. Returning to step 1014, if host 110 does not have more storage space to deallocate, method 1000 ends.

It should be noted that host 110 may continuously issue unmap commands to shared file system 160 as unmap commands are generated by VMs 122 and hypervisor 130, as long as host 110 issues such commands at the rate determined at 1006. Additionally, method 1000 may be repeated if an administrator updates one or both of unmap bandwidth value 900 and max unmap space per iteration value 910, to determine a new rate for issuing unmap commands to shared file system 160, and to issue unmap commands at the new rate. Additionally, as a simplification, each of hosts 110 may simply issue unmap commands each second. For example, if the rate determined at step 1006 is 2 megabytes per second, each second, each of hosts 110 may simply issue unmap commands to shared file system 160 requesting 2 megabytes be deallocated from files thereof.

Additionally, host 110 may periodically determine the number of hosts 110 accessing shared file system 160, e.g., every predetermined length of time such as every 5 minutes. For example, host 110 may periodically scan a region of shared file system 160 that includes all the heartbeat slots allocated to hosts 110. Such heartbeat slots may include heartbeat timestamps such as those discussed above with respect to FIG. 3. Similar to the above discussion with respect to unmap owner locks 220, for each heartbeat slot, host 110 may consider the corresponding one of hosts 110 to be alive if it has updated the timestamp recently, e.g., in the past predetermined number of seconds such as 10 seconds, and host 110 may consider the corresponding one of hosts 110 to not to be alive if it has not updated its timestamp recently. Host 110 may determine the number of hosts 110 accessing shared file system 160 based on the total number of hosts 110 that are alive, e.g., to be equal to the total number of hosts 110 that are alive. This value may change over time as additional hosts 110 begin accessing shared file system 160 and as some of hosts 110 stop accessing shared file system 160. As such number changes, host 110 may recalculate the rate for issuing unmap commands per host, in the manner discussed above in conjunction with step 1006.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

The embodiments described herein also relate to an apparatus for performing these operations. The apparatus may be specially constructed for required purposes, or the apparatus may be a general-purpose computer selectively activated or configured by a computer program stored in the computer. The embodiments described herein may also be practiced with computer system configurations including mobile computing devices, personal computers, server computers, microprocessor systems, mainframe computers, etc., and combinations thereof, which may communicate across one or more networks.

The embodiments described herein also relate to one or more computer programs or as one or more computer program modules embodied in computer-readable storage media. The term computer-readable medium refers to any data storage device that can store data, which can thereafter be input into an apparatus or computer system. Computer-readable media may be based on any existing or subsequently developed technology that embodies computer programs in a manner that enables a computer to read the programs. Examples of computer-readable media include magnetic drives, SSDs, NAS systems, RAM, read-only memory (ROM), compact disks (CDs), digital versatile disks (DVDs), and other optical and non-optical data storage devices. A computer-readable medium can also be distributed over a network-coupled computer system so that computer-readable code is stored and executed in a distributed fashion.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

As used herein, the phrase "at least one of" preceding a series of items with the term "and" or "or" to separate any of the items, modifies the list as a whole, rather than each member of the list (i.e., each item). The phrase "at least one of" does not require selection of at least one of each item listed. Rather, the phrase allows a meaning that includes at least one of any one of the items, and/or at least one of any combination of the items. By way of example, the phrases "at least one of A, B, and C" and "at least one of A, B, or C" each refers to only A, only B, only C, and/or any combination of A, B, and C. In any instances in which it is intended that a selection be of "at least one of each of A, B, and C," or alternatively, "at least one of A, at least one of B, and at least one of C," the selection is expressly described as such.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components may be implemented as a combined component. Similarly, structures and functionalities presented as a single component may be implemented as separate components. These and other variations, additions, and improvements may fall within the scope of the appended claims.

What is claimed is:

1. A host computer including a processor and memory, wherein the processor executes instructions stored in the memory to issue one or more unmap commands to a file system of a storage device, the file system being shared by a plurality of host computers including the host computer, by performing the following steps:

acquiring unmap privilege information from the storage device, the unmap privilege information indicating whether or not an unmap privilege is available to the host computer;

in response to determining that the unmap privilege is available, transmitting a request to update an unmap privilege file stored in the storage device to indicate that the host computer has the unmap privilege; and then issuing to the file system, the one or more unmap commands to deallocate storage space from one or more files of the file system.

2. The host computer of claim 1, wherein the unmap privilege is associated with a plurality of data structures stored in the unmap privilege file, and the unmap privilege information includes the unmap privilege file, and wherein the steps further include:

locating in the unmap privilege file, a data structure of the data structures indicating that the unmap privilege is available to the host computer.

3. The host computer of claim 2, wherein the steps further include:

determining that in the data structure, an owner field is empty of any identifiers of the host computers.

4. The host computer of claim 2, wherein the steps further include:

determining that in the data structure, a liveness indicator field indicates that another host computer of the host computers that previously acquired the unmap privilege, is not alive to other devices including the storage device.

5. The host computer of claim 1, wherein the unmap privilege information includes a status of another host computer of the host computers with respect to issuing unmap commands to the file system, and the steps further include:

requesting the other host computer to update the unmap privilege file to indicate that the host computer has the unmap privilege, based on the status of the other host computer.

6. The host computer of claim 1, wherein the steps further include:

after issuing the one or more unmap commands to the file system, instructing the storage device to update the unmap privilege information to indicate that the unmap privilege is free to be acquired by others of the host computers.

7. The host computer of claim 1, wherein the steps further include:

in response to determining that the unmap privilege is available, instructing the storage device to update the unmap privilege information to store information for a liveness indicator field indicating that the host computer is alive to other devices including the storage device.

8. A method of issuing one or more unmap commands to a file system of a storage device, wherein the file system is shared by a plurality of host computers including a host computer, the method comprising:

acquiring unmap privilege information from the storage device, the unmap privilege information indicating whether or not an unmap privilege is available to the host computer;

in response to determining that the unmap privilege is available, transmitting a request to update an unmap privilege file stored in the storage device to indicate that the host computer has the unmap privilege; and then issuing to the file system, the one or more unmap commands to deallocate storage space from one or more files of the file system.

9. The method of claim 8, wherein the unmap privilege is associated with a plurality of data structures stored in the unmap privilege file, and the unmap privilege information includes the unmap privilege file, the method further comprising:

locating in the unmap privilege file, a data structure of the data structures indicating that the unmap privilege is available to the host computer.

10. The method of claim 9, further comprising:

determining that in the data structure, an owner field is empty of any identifiers of the host computers.

11. The method of claim 9, further comprising:

determining that in the data structure, a liveness indicator field indicates that another host computer of the host computers that previously acquired the unmap privilege, is not alive to other devices including the storage device.

12. The method of claim 8, wherein the unmap privilege information includes a status of another host computer of the host computers with respect to issuing unmap commands to the file system, the method further comprising:

requesting the other host computer to update the unmap privilege file to indicate that the host computer has the unmap privilege, based on the status of the other host computer.

13. The method of claim 8, further comprising:

after issuing the one or more unmap commands to the file system, instructing the storage device to update the unmap privilege information to indicate that the unmap privilege is free to be acquired by others of the host computers.

14. The method of claim 8, further comprising:

in response to determining that the unmap privilege is available, instructing the storage device to update the unmap privilege information to store information for a liveness indicator field indicating that the host computer is alive to other devices including the storage device.

15. A non-transitory computer-readable medium comprising instructions that are executable in a host computer, wherein the instructions when executed cause the host computer to carry out a method of issuing one or more unmap commands to a file system of a storage device, the file system being shared by a plurality of host computers including the host computer, and wherein the method comprises:

acquiring unmap privilege information from the storage device, the unmap privilege information indicating whether or not an unmap privilege is available to the host computer;

in response to determining that the unmap privilege is available, transmitting a request to update an unmap privilege file stored in the storage device to indicate that the host computer has the unmap privilege; and then issuing to the file system, the one or more unmap commands to deallocate storage space from one or more files of the file system.

16. The non-transitory computer-readable medium of claim 15, wherein the unmap privilege is associated with a plurality of data structures stored in the unmap privilege file, and the unmap privilege information includes the unmap privilege file, and wherein the method further comprises:

locating in the unmap privilege file, a data structure of the data structures indicating that the unmap privilege is available to the host computer.

17. The non-transitory computer-readable medium of claim 16, wherein the method further comprises:

determining that in the data structure, an owner field is empty of any identifiers of the host computers.

18. The non-transitory computer-readable medium of claim 16, wherein the method further comprises:

determining that in the data structure, a liveness indicator field indicates that another host computer of the host computers that previously acquired the unmap privilege, is not alive to other devices including the storage device.

19. The non-transitory computer-readable medium of claim 15, wherein the unmap privilege information includes a status of another host computer of the host computers with respect to issuing unmap commands to the file system, and wherein the method further comprises:

requesting the other host computer to update the unmap privilege file to indicate that the host computer has the unmap privilege, based on the status of the other host computer.

20. The non-transitory computer-readable medium of claim 15, wherein the method further comprises:

after issuing the one or more unmap commands to the file system, instructing the storage device to update the unmap privilege information to indicate that the unmap privilege is free to be acquired by others of the host computers.

* * * * *